Aug. 24, 1965   H. R. MELINE ETAL   3,202,372
CABLE STORAGE AND RETRIEVER UNIT
Filed Nov. 12, 1963   3 Sheets-Sheet 3

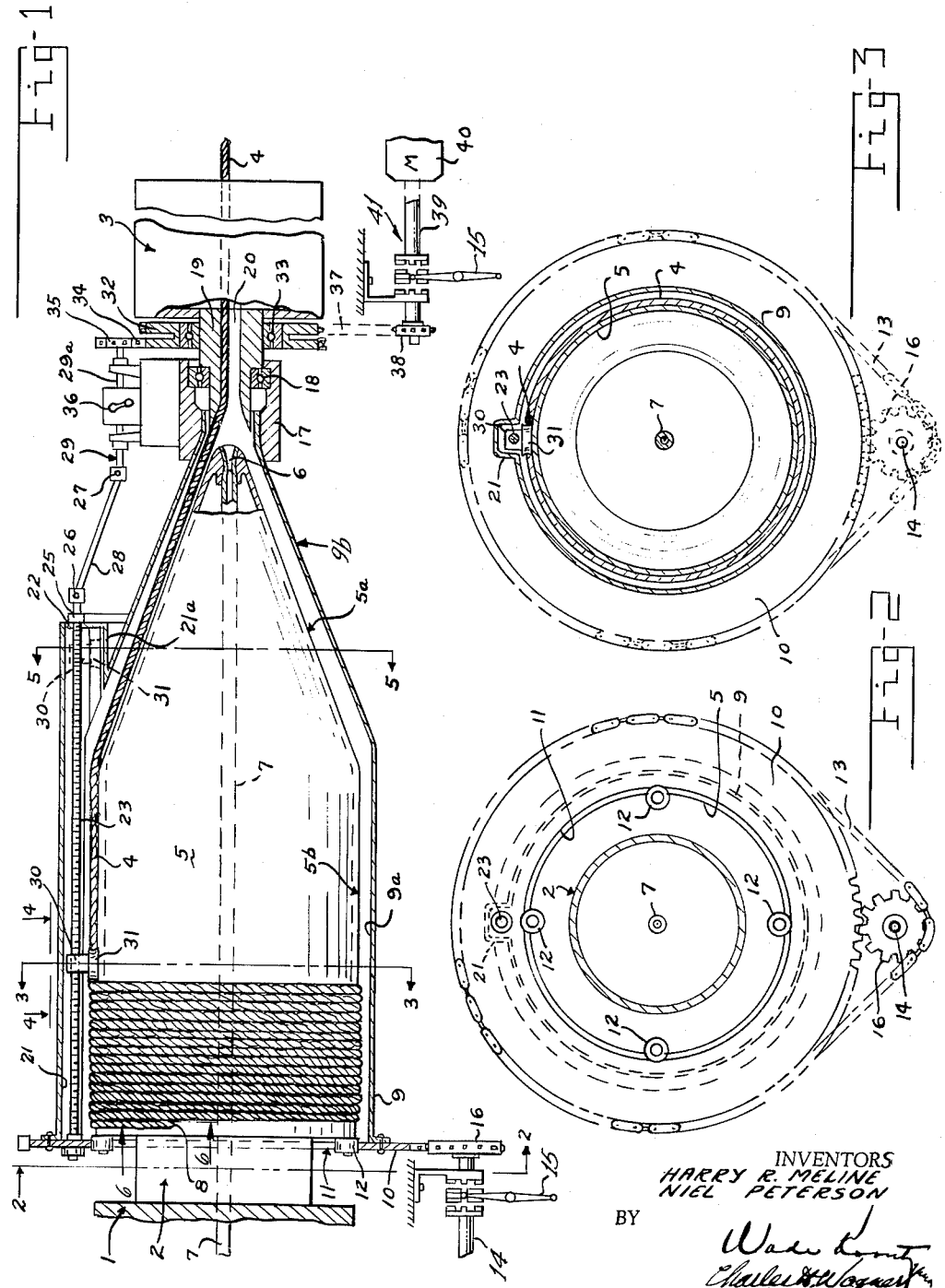

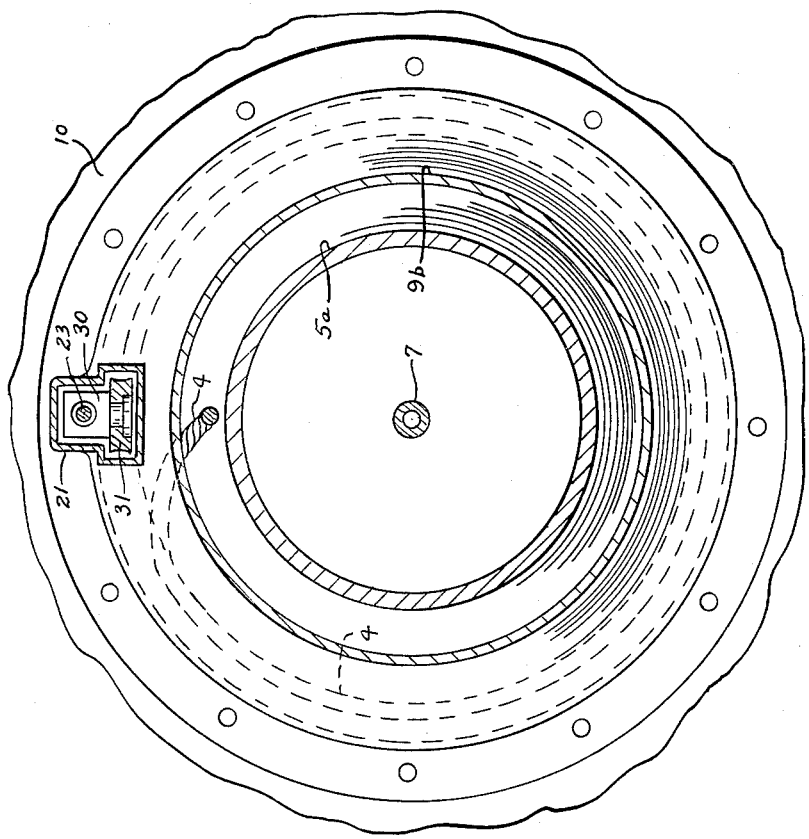
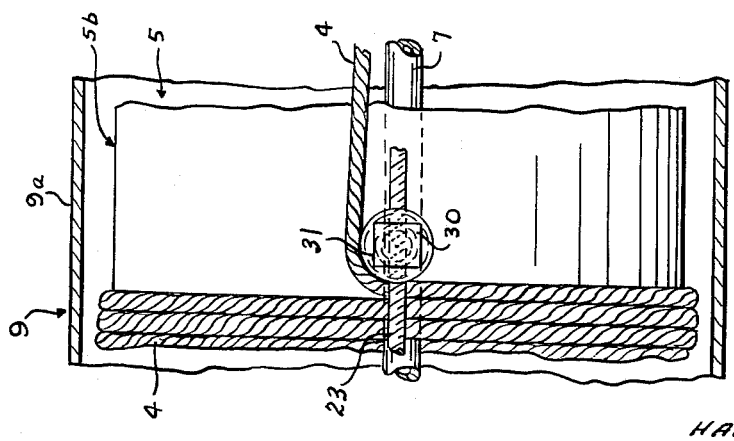

INVENTORS
HARRY R. MELINE
NIEL PETERSON

BY Wade Koontz
Charles H. Wagner
ATTORNEYS 3,202,372
CABLE STORAGE AND RETRIEVER UNIT
Harry R. Meline and Niel R. Petersen, Minneapolis, Minn., assignors to the United States of America as represented by the Secretary of the Air Force
Filed Nov. 12, 1963, Ser. No. 323,185
7 Claims. (Cl. 242—54)

This invention relates to winding and reeling devices and, more particularly, to cable storage, payout, and retriever units for steel wire rope cable, having for an object means whereby a wire rope cable may be paid out very rapidly with low inertia and resistance to pulling force, and provide means by which the cable may be quickly retrieved or rewound to its original storage or battery condition, ready for another operation.

A further object is the provision of a steel wire rope cable retriever and payout device, primarily for use in connection with a cable brake energy absorber for aircraft arresting gear, in which relatively little inertia of the cable mass is felt or received by the arresting gear system, regardless of the rate that the cable is withdrawn through the cable brake energy absorber.

A further object includes a stationary cable storage drum capable of receiving from a few hundred to at least two thousand feet of aircraft arresting cable in a single layer and means for rewinding the cable quickly around the drum, after it is withdrawn in decelerating the speed of an aircraft, in which said winding means is movable out of the way to permit the coils of the cable to be withdrawn in such a way that only two or three cable loops are in motion inside of the unit at any instant, thereby eliminating inertia forces of the stored cable mass while the cable is being withdrawn through the arresting gear during the inertia arresting action on a landing aircraft.

A further object of the invention is the provision of a cable storage, payout, and retrieving unit which provides a rewinding characteristic which may be used to apply pretension to a deck pendant cable adapted to be stretched transversely across a runway or deck and adapted to be engaged by an aircraft which enters the arresting gear system.

A further object is the provision of a wire rope storage and payout device or unit which permits payout of the wire rope therefrom at very high speeds with extremely low effective inertia for the stored cable therein.

Another object includes means for preventing excessive rise in temperature in the device as the cable is being withdrawn at high speed through a centering opening from the cable storage and retrieving unit into and through a cable braking an aircraft arresting unit.

Other objects and advantages of the invention will become apparent from the following description and accompanying drawings in which like reference characters refer to like parts in the several figures.

FIG. 1 is a longitudinal sectional view through a cable storage, payout and retrieving unit incorporating the invention, the stationary cable drum and cable being shown in elevation, together with a cable braking or retarding device forming a part of the aircraft cable arresting gear through which the arresting cable passes, which is shown diagrammatically. Dotted lines illustrate the cable retrieving pulley unit out of the way, prior to cable payout.

FIG. 2 is a transverse sectional view taken about on the plane indicated by line 2—2 of FIG. 1, showing the inner end of the cable storage and retriever unit in end elevation.

FIG. 3 is a transverse sectional view taken about on line 3—3 of FIG. 1.

FIG. 4 is an enlarged fragmentary plan view, taken about on the plane indicated by line 4—4 in FIG. 1, however, with the outer housing broken away to show cable, cable laying pulley, slide block, and lead screw members more clearly.

FIG. 5 is an enlarged transverse sectional view taken about on line 5—5 in FIG. 1, with the peripheral portion of the large drive sprocket for the rotary housing broken away.

FIGURE 6 is a fragmentary detailed sectional view through the cable drum 5 and support 2, taken about on the plane indicated by line 6—6 in FIG. 1, showing a conventional method for "dead ending" the cable 4 on the stationary drum 5.

Figure 7:
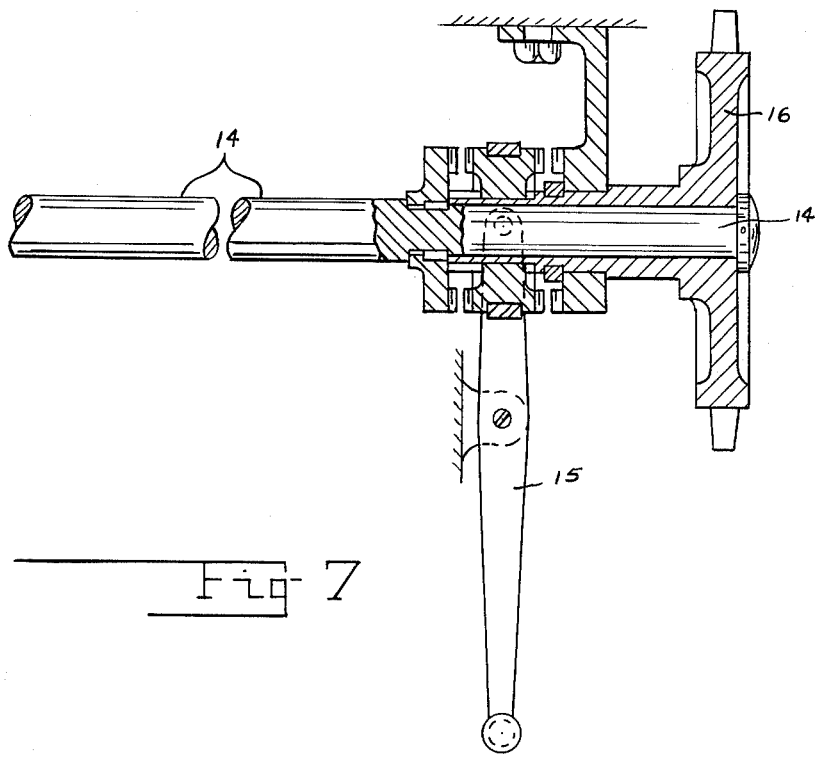
Figure 8:
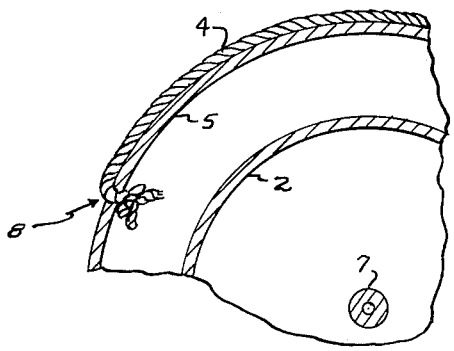

FIGURE 7 is an enlarged detail sectional view showing a conventional clutch and brake means 15 for driving the sprocket 16 to rotate the outer drum or shell 9, or holding the sprocket 16 stationary to prevent rotation of the shell 9, in a manner similar to the clutch and "brake" device 41.

The principal intended use for this invention is in connection with aircraft arresting gear especially the types employing an arresting cable adapted to be stretched across an aircraft runway or deck, to be picked up by a landing aircraft, in which some type of cable braking means is provided for gradually braking or slowing down the pull out of the cable. This braking means forms no part of this invention since the invention is in the unit for feeding the cable to the braking device without inertial resistance, and retrieving the cable quickly to condition the arresting system for a subsequent aircraft arresting engagement.

Referring to the drawings, the reference numeral 1 denotes a fixed rigid support having a fixed annular drum support or collar 2 projecting horizontally toward an arresting cable braking device 3 for automatically arresting or decelerating the rate of pullout travel of an aircraft arresting cable 4 after it is engaged by a landing aircraft. The details of the arresting device 3 not forming a part of this invention are not shown.

A fixed or stationary elongated cable receiving and payout drum 5 projects outwardly, in fixed concentric relation to the fixed annular collar or support 2, toward the cable receiving device 3, the cable drum terminating in a conical nose or outer end portion 5a from which the cable payout is accomplished. Located in the apex of the conical portion 5a is a spray nozzle 6, supplied by water or other cooling medium by a supply pipe 7.

As seen in FIGS. 1, 4 and 5, the arresting wire rope or cable 4 is dead ended at 8 in the rear end portion of the stationary drum member 5, as seen in FIG. 6, and the cable is coiled or wrapped around the circumference of the cylindrical portion 5b with the coils wrapped in side-by-side relation without any jamming, binding or overlapping tendency, at the same time not permitting excessive clearance between each cable wrap to the extent that the cable storage area 5b of the drum 5 is effected.

The size of the cable 4 in the drawing is somewhat exaggerated since in practice the drum storage area 5b will be sufficient to receive and store from two hundred to at least two thousand feet of wire rope arresting cable without the coil wraps overlapping.

A rotary housing, or outer shell, 9 surrounds the stationary cable drum 5 in spaced relation, having a cylindrical portion 9a, with an inner diameter larger than the inner stationary drum 5 by an amount equal to twice the cable diameter plus a small additional amount to provide suitable working clearances.

The outer drum or housing 9 has a forwardly extending conical portion 9b surrounding the conical end or conical nose portion 5a and the nozzle 6, and is held in stationary relation to the drum 5 during the payout or withdrawal of the wraps of the cable 4 from the surface of the drum portion 5b.

The rear end of the housing 9 has a concentric sprocket gear or disk 10 having an inner circular opening 11 which rides on a plurality of bearing members or rollers 12, thus supporting the rear end of the housing for rotation in concentric relation to the stationary cable drum 5, and the sprocket teeth around the periphery of the sprocket gear or disk 10 carries a drive chain 13 which is driven when it is desired to retrieve cable onto the drum 5, or held stationary when it is desired to payout the cable.

Any suitable means may be provided for this purpose, for instance, such as shown in FIG. 7, a drive shaft 14 and clutch device 15 which is movable in one direction, to the left, to drive the small sprocket 16 for rotating the housing 9 through the chain 13 or moved in the opposite direction, to the right, to declutch and lock the small sprocket 16 against rotation, thus locking the housing or outer shell 9 against rotation during the cable payout operation.

The front end or apex end of the conical portion 9b of the housing 9 extends into a bearing block or hub member 17, carried on suitable bearings 18 which are mounted on a fixed tubular cable-receiving extension or trunnion 19 as shown, projecting from the cable brake retarding device 3, this extension having a central cable guide opening 20 therethrough into the device 3, having its forward end faired into the conical inner surface of the conical portion 9b of the housing 9. The housing 9 is thus supported for rotation at its front and rear ends in concentric relation to the axis of the cable drum 5.

One side of the housing or outer drum (shown at the top in the figures of the drawing) is provided with a longitudinal channel or guideway, indicated at 21 and extending from the large drive sprocket 10 to a point 22 almost midway between the opposite ends of the conical portion 9b.

A threaded stem or lead screw 23 extends longitudinally within the channel 21, having one end journalled at 24 in the large driving sprocket or disk 10 while its opposite end is suitably journaled at 25 at the forward end or extension of the channel 21. The forward end of the lead screw 23 is drivably connected by universal joints 26 and 27 and the shaft 28 to a lead screw drive shaft 29.

Suitably threaded on the lead screw 23 is a travelling sleeve assembly comprising a pulley mounting means or slide block 30 having a guide pulley 31 journalled thereon with its axis perpendicular to the cylindrical surface of the drum 5, and the side or face of the grooved pulley 31 disposed in very closely spaced substantially tangent relation to the outer surface of the drum 5, as seen in FIGS. 3 and 4.

Rotation of the lead screw 23 in one direction advances the pulley 31 along the surface of the drum 5 in one direction while rotation of the lead screw in the opposite direction advances the pulley along the surface of the drum 5 in the opposite direction.

When the pulley is advanced toward the forward end of the housing 9 it will be noted that it is finally movable into the forward end or extension 21a of the channel 21 and out of the general confines of the conical portion 9b as seen in FIG. 1. Thus, when the pulley slide block assembly 30–31 is moved forwardly from the full line position shown in FIG. 1 to the dotted line position, and the housing or outer drum is held stationary, the coils or wraps of the cable 4 around the fixed drum can then be pulled off the drum through the hub member 17 and trunnion 19 with substantially no resistance due to inertia of the drum 5 or of the cable portion remaining on the drum 5. This is important in aircraft arresting gear systems since the initial pick up of the cable by a high speed aircraft causes an initial high velocity pull out of the cable through the cable brake retarding device 3. The inertia of a conventional rotatable drum and cable thereon would place unnecessary initial strains on the arresting gear system.

Twin sprocket members 32 are journalled on the trunnion member 19 for free rotation on suitable bearings 33, one of the sprockets 32 being connected by a sprocket chain 34 to a sprocket 35 fixed on a shaft 29a for driving the shaft 29, and thus rotating the lead screw 23 through a suitable transmission of conventional type, such as a speed change and reversing gear set 36.

The other sprocket of the twin sprockets 32 is connected by a chain 37 to a drive sprocket 38 fixed on a drive shaft 39, which can be driven by a suitable motor 40 through a clutch and brake means 41 similar to the clutch and brake device 15, as shown in FIGURE 7, whereby the shaft 39 can be rotated or held stationary.

When it is desired to wind a layer of (arresting) cable 4 on the stationary inner drum member 5, the slide block 30 is moved from the dotted, out-of-the-way position shown in FIG. 1 to a full line position to dispose the pulley 31 up against the last or remaining wrap or coil of the cable 4 on the stationary inner drum 5, as seen in full lines in FIG. 1 (assuming that all of the coils of the cable have not been withdrawn). This may be accomplished by rotation of the shaft 39 which, in turn through the speed change device 36, rotates the lead screw 23 in the correct direction as is obvious, after which the clutch and brake device 41 is actuated to lock the sprocket 38 against rotation, and thus the twin sprocket 32 is locked against rotation, and the clutch 15 is engaged to rotate the outer drum or housing 9 around the inner stationary drum 5.

At this time, the speed change device 36 is actuated to drive the lead screw 23 in the desired direction and speed to advance the slide block 30 and pulley 31 along the drum 5 toward the conical end 5a as the housing, or outer shell, 9 rotates to planetate the pulley 31 around the cable drum 5. The combined advance and planetary motion of slide block and pulley along the drum 5 being such that a movement thereof along the lead screw 23 during each rotation of the housing 9 is equal to about or slightly in excess of the diameter of the cable 4 being wound thereon, the cable 4 being drawn through the central guide opening 20, along the surface of the drum 5, and passing around the pulley 31, as seen in FIG. 4, is laid on the drum 5, next to the preceding wrap.

After the housing 9 has been rotated a sufficient number of revolutions to wrap the desired length of the cable around the drum 5, as seen in FIGS. 1 and 4, the clutch device, such as 15 of any conventional type (see FIG. 7), may be shifted to interrupt the drive between the shaft 14 and the large sprocket 10 and lock the sprocket 10 and thus housing 9 against rotation. However, in order to retract the pulley 31 quickly out of the way of the cable 4 on the drum, prior to withdrawal of the cable from the drum 5, means such as the brake and clutch 41 of the type shown in FIG. 7 may be shifted to connect the motor 40 to the drive sprocket 38 to rotate the twin sprocket 32 and drive the sprocket 35 and screw shaft 29a, which through parts 29, 27, 28 rotates the lead screw 23 to move the slide block and pulley members 30 and 31 along the drum into the extended end 22 of the channel 21, as shown in dotted lines in FIG. 1.

If it is desired to retract the cable drum winding pulley 31 along the lead screw 23 out of the way quickly into the end 21a, the speed change device, such as indicated at 36, may be provided to rotate the lead screw more rapidly during its slide block retracting movement. Also, if it is desired to move the slide block and pulley 30–31 longitudinally along the drum surface while the housing is stationary to initially pick up the cable and move the first wrap quickly against the preceding wraps on the drum, the device 36 may include a high speed reverse gear set of conventional or obvious design. However, it should be again emphasized that the speed and thread ratio of the lead screw to the rate of rotation of the housing during the cable drum retrieving or wrapping operation is such that the pulley 31 is advanced along the drum 5 from the inner end toward the outer end at a rate such that for each rotation of the outer drum or housing 9, the slide block and pulley is advanced toward the cable storage end 21a of the channel 21 an amount equal to or very slightly greater than the diameter of the cable being wrapped on the drum.

When the arresting cable 4 has been retrieved and wrapped on the drum 5 and the slide block pulley device 30–31 moved out of the way into the end 21a as described, the device may be considered in battery condition with the outer casing preferably being held fixed against rotation by the brake and clutch device 15.

When the arresting cable 4 is withdrawn from the retriever at high velocity through the opening 20, the cable is drawn along the cylindrical drum portion 5b and tapered nose portion 5a, only a few loops or wraps at a time such that relatively little inertia of the cable mass is felt by the arresting gear system. This low inertia system is advantageous in aircraft arresting systems, since the stored cable may be of any length without imposing inertial forces of any significant magnitude upon the aircraft being arrested.

During the withdrawal of the cable 4 from the drum 5 and through the guide opening 20 at the high velocity required, a suitable cooling means is provided, consisting of a water spray nozzle 6 for directing a cooling medium, such as water, onto the cable and trunnion opening as the cable passes through, water being supplied to the nozzle 6 by any suitable means such as the supply pipe 7.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the appended claims.

We claim:

1. A wire rope cable retrieving and payout device for an aircraft arresting wire rope cable comprising, a fixed support, an elongated stationary cable retrieving, storage and payout drum fixed on said support against rotation having an elongated cylindrical cable receiving portion extending axially away from said support, terminating in an outer substantially conical end portion faired into the outer end of said cylindrical portion, arresting cable guide means fixed in concentric outwardly spaced relation to the apex end of said conical end portion, means for dead-ending a wire rope arresting cable on said cylindrical portion adjacent said fixed support, cable retrieving or laying pulley movable along the surface of said drum substantially tangent thereto in parallel relation to said cylindrical cable receiving portion thereof between a point spaced outwardly toward the outer extremity of said conical end portion to a point adjacent said fixed support, means for producing a planetary motion of said pulley concentrically around said stationary drum while simultaneously advancing said pulley along said cylindrical drum surface in a direction from said fixed support toward said conical end portion at a rate of axial movement relative to the axis of said drum substantially equal to but not less than the diameter of the arresting cable when dead-ended on said drum by said dead-ending means, during each cycle of planetary motion of said pulley means around the axis of said drum, whereby said pulley picks up said arresting cable and wraps a layer of coils of said cable on said cylindrical portion in close side-by-side relation from said dead-ending means toward said conical end portion, said means including means for moving said pulley outwardly away from said cylindrical portion out of the path of said cable extending from said cylindrical drum portion to said cable guide means to permit the wraps of the cable to be severally withdrawn along the surface of the drum and across said conical portion when the cable is withdrawn through said arresting cable guide means.

2. A wire rope cable retrieving, storing, and payout unit for aircraft arresting wire rope cable comprising, a fixed support, an elongated cylindrical cable drum fixed at one end on said support against rotation, said cable drum having an elongated cylindrical cable receiving portion extending in a direction away from said support, terminating in an outer conical end portion faired into said cylindrical portion, cable retrieving and payout guide means disposed in concentric outwardly spaced relation to the outer end of said conical end portion, means for dead-ending a wire rope cable on said cylindrical portion adjacent said fixed support, cable retrieving guide pulley means movable along the surface of said drum in substantially tangent parallel relation to said cylindrical cable receiving portion thereof between a point spaced outwardly toward the outer extremity of said conical end portion to a point adjacent said fixed support, means for producing a planetary motion of said pulley means concentrically around the axis of said stationary drum while simultaneously advancing said pulley means along said cylindrical surface of said drum in a direction from said fixed support toward said conical end portion at a rate of axial movement relative to the axis of said drum substantially equal to but not less than the diameter of the arresting cable when dead-ended on said drum by said dead-ending means, during each cycle of planetary motion of said pulley means around the axis of said drum, for causing said pulley means to pick up said cable and wrap a single layer of coils thereof on said cylindrical portion in close side-by-side relation from said dead-ending means toward said conical end portion, said means including means for moving said pulley means along the surface of said drum in the opposite direction beyond the outer end of said cylindrical portion for radially spacing the pulley means outwardly from said conical portion and forwardly of the outer end of said cylindrical portion a sufficient distance to permit the wraps of the cable on the cylindrical portion to be withdrawn from the drum during the payout of the cable through said cable guide means, without the inertia of the mass of the cable remaining on the drum being effective to retard the rapid withdrawal of the cable on the drum through said cable retrieving and payout guide means.

3. In a wire rope cable payout, retrieving and storage device, a stationary cable drum having a cylindrical cable receiving surface adjacent one end, means for fixedly supporting said drum at said one end, said drum having an outer conical surface at its opposite end leading axially away from said cylindrical surface, means for securing a cable to the surface of said drum at said one end, a hollow trunnion member fixed in axially spaced relation to the apex of said conical surface at said opposite end having an axial cable guide opening therethrough, an outer rotatable housing surrounding said drum, journalled at an inner end on the inner end of said drum and at its outer end on said trunnion member for concentric rotation about the axis of said drum, said housing having a cylindrical portion surrounding the cylindrical portion of said drum in an outwardly spaced relation thereto equal to about one and a half times the diameter of the cable aforesaid and a conical end extending from the cylindrical portion of the housing to said trunnion member in a spaced surrounding relation to the conical portion of said drum not less than one and a half times the diameter of the cable aforesaid, said housing having an inner longitudinal channel formed therein extending from said inner end thereof to a point materially beyond the juncture of the cylindrical portion thereof with the conical portion thereof, a lead screw rotatably journalled in said channel at the opposite ends thereof in parallel relation to the axis of said housing, a slide block threaded on said lead screw for movement in said channel in opposite directions upon rotation of said lead screw in opposite directions, a cable guide pulley journalled on said slide block on an axis substantially perpendicular to rotary axis of said housing with the face of said pulley adjacent the drum, disposed substantially tangent to the cylindrical surface of said drum, means for rotating said housing around the axis of said drum, and means for simultaneously rotating said lead screw at a relatively predetermined rate, for advancing said slide block from said inner end portion of said channel to the opposite end thereof at a rate substantially equal to but not less than the diameter of the referred to cable, including means for rotating said lead screw in the opposite direction to move said slide block and pulley from said outer end of said channel, along said drum toward the inner end thereof, to pick up a cable dead-ended adjacent the inner end of the drum and extending along the surface of the drum and through said cable guide means, whereby reverse rotation of said lead screw and rotation of said housing causes said pulley to wrap a single layer of the aforesaid cable on the cylindrical portion of said drum from the inner end to the conical portion thereof, and continued rotation of said lead screw moves said pulley beyond the cylindrical portion, to the outer end of the channel radially out of the way of the aforesaid cable, when withdrawn through said cable guide opening while said housing remains stationary, and means for holding said housing stationary during withdrawal of the aforesaid cable from the surface of said drum through said cable guide opening.

4. In an aircraft arresting cable retrieving, storage and cable payout device of the class described, an elongated stationary cable drum fixedly supported at an inner end and projecting outwardly therefrom on a central axis, having an elongated cylindrical cable receiving and storage outer surface extending away from said inner end, an outer rotatable housing surrounding said drum from end to end thereof having a cylindrical portion surrounding the cylindrical portion of said drum in spaced relation by a distance not exceeding two and half times the diameter of the cable to be retrieved, stored on, and payed out from said cable drum, means rotatably supporting said housing at its opposite ends for rotation around said central axis, said housing having a longitudinal slide block receiving channel formed in one side of the inner surface thereof, extending from said inner end to a point materially beyond the outer end of the cylindrical surface of said drum, a cable guide pulley support movable along said channel from end to end thereof having a cable guide pulley journalled thereon having a side thereof tangent to the cylindrical surface of the drum, means for simultaneously rotating said housing in one direction and moving said guide block along said channel from the inner end of the channel to the outer end of the channel at a rate substantially equal to, but not less than the diameter of a cable to be retrieved on the drum during each rotation of said housing, and means for dead-ending an arresting cable to be retrieved, stored and payed out from said drum, at the inner end of the cylindrical surface of the drum.

5. Apparatus as claimed in claim 4 including means for holding said housing stationary during movement of said slide block in one direction along said channel.

6. In an aircraft arresting cable retrieving, storage and payout device, an elongated stationary cable drum fixedly supported at one end thereof, projecting outwardly from said fixedly supported end comprising an elongated cylindrical cable receiving drum portion adjacent said fixed end, said drum having a conical outer end faired into the outer end of the surface of the cylindrical portion, said drum having a central axis, a trunnion member fixed concentric to said central axis in axially spaced relation to said conical outer end, said trunnion member having a cable fair lead central opening therethrough, a rotary housing surrounding said cable drum from end to end thereof having an inner end journalled on the inner end of said cylindrical portion of said drum and an outer end journalled on said trunnion member, said housing having a cylindrical portion surrounding the cylindrical portion of said drum faired into a conical portion surrounding the conical portion of said drum with the outer end thereof faired into said central opening in the trunnion member, said housing having a longitudinal channel formed in the inner surface thereof extending from the inner end of the housing parallel to the surface of said cylindrical portion of the drum to a point opposite the conical portion of the drum and materially outward from the conical surfaces of the housing, said cylindrical portion of said housing being concentrically spaced outwardly from the cylindrical portion of the drum by a distance not exceeding two and a half times the diameter of an arresting cable dead-ended on said drum adjacent the inner end thereof, a lead screw rotatably mounted in said channel in parallel relation to the cylindrical surface of said drum, a slide block threaded on said lead screw for axial movement in said channel between the opposite ends thereof, a cable guide pulley journalled on said slide block on an axis perpendicular to the central axis aforesaid with one side of the pulley disposed substantially tangent to the cylindrical surface of the drum, drive means for rotating said housing around said central axis to cause planetary motion of said pulley around said drum, and means for rotating said lead screw during rotation of said housing for advancing said slide block along said channel in a direction from the inner end to the outer end of the channel a distance substantially equal to but not less than the diameter of the arresting cable when dead-ended on the drum, during each rotation of the housing.

7. In a cable retrieving, storage, and payout device for wire rope cable, a fixed support, an elongated cable drum fixed at its inner end on said support against rotation having a substantially cylindrical elongated cable receiving portion adjacent said inner end and faired at its outer end into a substantially conical concentric outer end, centrally fixed tubular cable guide means spaced axially and concentrically outwardly from the apex of said conical outer end to receive and payout the cable therethrough dead-ended on said drum adjacent said inner end, a lead screw rotatable in parallel relation to the axis of said drum, extending along the surface of said drum in closely spaced relation to the cylindrical portion from said inner end to an outer end of the cylindrical portion, projecting materially beyond the outer end of the cylindrical portion opposite said conical outer end, means for rotating said lead screw on its axis and simultaneously planetating said lead screw around the axis of said drum, guide pulley mounting means threaded on said lead screw for axial movement along said drum from said inner end toward said outer end of said conical portion incident to combined rotation and planetary motion of said lead screw in one direction relative to said fixed cable drum including a cable guide pulley journalled on said guide pulley mounting on an axis perpendicular to the axis of said drum with one face thereof rotatable in substantially tangent relation to the surface of the cylindrical cable receiving portion of said drum, said guide pulley mounting means advanced by said lead screw means along the surface of said drum during each cycle of planetary motion of said lead screw means around said drum a distance substantially equal to but not less than the diameter of a cable to be wrapped on the said cylindrical elongated cable receiving portion and further advanced along said lead screw, during rotation thereof, beyond the outer end of said cylindrical portion into increased outwardly radially spaced relation to said conical portion toward the outer end of the conical portion to permit the cable to pass between the guide pulley and the cable drum conical portion during withdrawal of the cable from the drum through said centrally fixed cable guide means.

References Cited by the Examiner

UNITED STATES PATENTS

| | | | |
|---|---|---|---|
| 2,685,097 | 8/54 | Allen | 242—54 X |
| 2,941,746 | 6/60 | Hunt | 242—82 |
| 2,950,876 | 8/60 | McLoughlin | 242—54 X |
| 3,025,019 | 3/62 | Aschinger | 242—82 |

MERVIN STEIN, *Primary Examiner.*